United States Patent Office 3,809,768
Patented May 7, 1974

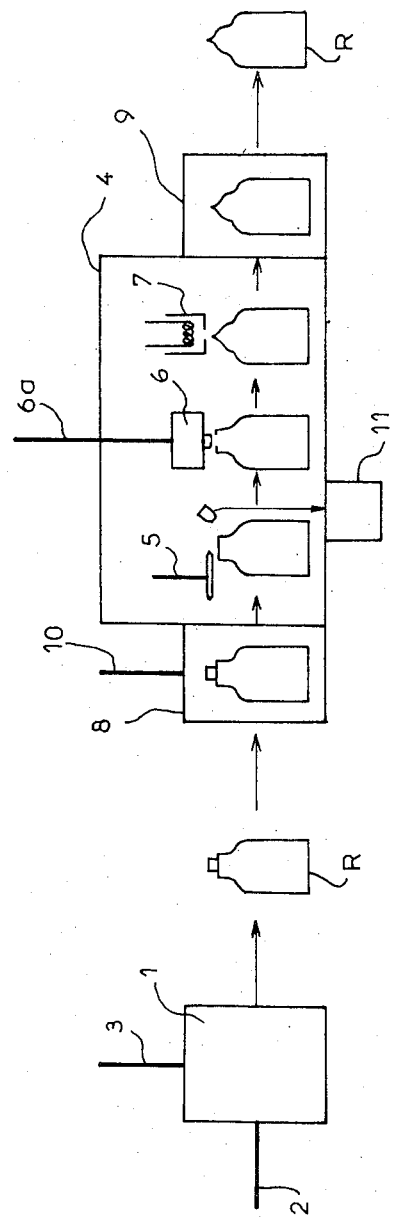

3,809,768
METHOD OF ASEPTIC PACKING A FOOD PRODUCT
Jean-Luc Berry, Mesnil sur l'Estree, France, assignor to E. P. Remy et Cie, Dreux, France
Filed July 22, 1971, Ser. No. 165,266
Claims priority, application France, July 31, 1970, 7028498
Int. Cl. A23l 3/00
U.S. Cl. 426—309                    8 Claims

ABSTRACT OF THE DISCLOSURE

The method of the invention consists in introducing containers, while sterilizing them externally, into a packing enclosure which is previously sterilized and maintained sterile together with everything contained therein, without destroying its sterility, the said enclosure containing devices for the transfer, the opening, the filling with the previously sterilized product to be packed into the container and the closing of said container, in opening the said containers, in filling them with the said product, in closing them sealingly, and in discharging them from the said enclosure without destroying the sterility of the latter.

---

The present invention has essentially for its object a method of aseptic packing or conditioning of any product, in particular a food product such as for instance a milk product or the like. It also relates to the apparatuses for the carrying out of the said method.

In order that a sterile product, i.e. a product having been subjected to a treatment for destroying all the micro-organisms which might be contained therein, be maintained in sterile condition subsequent to its packing or conditioning, i.e. subsequent to its introduction into any container for marketing purposes, it is important that not only the container itself should be internally sterile before being filled, but also that all the operations and handlings required for the said packing or conditioning (in particular the filling and closing of the container) be performed under aseptic conditions, i.e. that the said operations themselves should not introduce any germs or deleterious micro-organisms.

Methods of aseptic packing or conditioning of products are known, which consist in manufacturing packings from a material composed of cardboard and plastics, the said packings being sterilized by chemical means and filled with a sterilized product during the shaping operation. Such methods are limited to the use of packings whose shapes are derived from a plane surface by way of folding, e.g. tetrahedron-shaped packings. Moreover, the very nature of the material used does not allow thermal sterilization, which is more efficient and reliable than chemical sterilization.

Methods are also known, consisting in manufacturing a container by way of extrusion and moulding of a plastic and in performing the filling and the closing of the container in the mould where it is formed. Such methods result in considerable difficulties owing to the necessity of protecting the interior of the container prior and subsequent to the filling and closing thereof.

The present invention is directed at a method of aseptic packing or conditioning avoiding the drawbacks of the priorly known methods and using closed plastics containers for example, of high density polyethylene or polypropylene that have been internally sterilized, the said method being characterized in that it consists in introducing the containers, while sterilizing them externally, into a packing or conditioning enclosure which is previously sterilized and maintained sterile together with everything contained therein, without destroying its sterility, the said enclosure containing devices for the transfer, the opening, the filling with the previously sterilized product to be packed or conditioned and the closing, in opening the containers, in filling them with the said product and enclosing them sealingly, and then in discharging them from the said enclosure without destroying the sterility of the latter.

It is thus understood that the method according to the invention, in contradistinction to the methods using a cardboard-plastic packing complex, enables the internal sterility of sealed containers of any shape to be preserved and requires only the outer part of the containers to be sterilized at the inlet of the enclosure, i.e. a part which is never in contact with the product to be packed or conditioned in a sterile manner. Owing to the fact that the packing or conditioning of the product is performed in a sterile enclosure, i.e. outside the machine used for the manufacturing of the container, the complications and risks encountered in the methods wherein the filling of the said container is performed while the latter is still in the mould, are avoided.

According to still another feature of the invention, the transfer of the container from the manufacturing plant into the packing or conditioning enclosure is carried out in free atmosphere, for the container is subjected to a sterilization of its internal surface previous to its introduction into the said packing or conditioning enclosure.

The passing of the containers through free atmosphere, without impairing internal sterilization, enables the containers to be examined or checked before their entry into the packing or conditioning enclosure; the sterilization to which they are subjected externally during their introduction into the said enclosure prevents them from being contaminated.

Other features and advantages of the invention will appear from the following detailed description of aseptic packing or conditioning of any product by the method according to the invention illustrated diagrammatically in the single appended figure.

In this figure there is shown diagrammatically at 1 a blowing-extrusion machine producing sealed and internally sterile plastic containers R. The sterility of the containers is obtained in a manner known per se, by performing the blowing-extrusion at a temperature of, for instance, 160° C. or more, therefore under sterilizing conditions; it should be borne in mind that the blown air is sterile and that the closing is performed sealingly. For more reliability, a slight over-pressure is created within the said containers.

The container R thus formed is transferred into a sealed and sterile packing or conditioning enclosure 4 containing a device for the transfer of the containers (not shown), a device for opening the containers, shown diagrammatically at 5 and constituted for instance by a cutting member severing the upper portion of the container neck, a filling device shown diagrammatically at 6 and constituted for instance by a set of proportioning or dispensing pumps receiving through a duct 6a the previously sterilized product to be packed or conditioned, for instance milk, and a device for closing the containers, shown diagrammatically at 7 and constituted for instance by a heat-welding apparatus. The sealed enclosure 4 is provided with an inlet chamber 8 an outlet chamber 9 enabling the containers to move in and out without the interior of the said enclosure 4 communicating with the atmosphere. A piping 10 enables any sterilizing agent, for instance a microbicidal or germ-killing solution, to be conveyed into the chamber 8. A chamber 11 is also provided for the discharge of the severed portions of the containers as will be explained in the following.

The sterilization of the enclosure 4 and the devices contained therein, as well as the sterilization of the various chambers 8, 9 and 11, may be performed by a sterilizing method such as described in U.S. application No. 155,420 filed on June 22, 1971 in the applicant's name.

Furthermore, the said enclosure may be maintained under a pressure slightly higher than atmospheric in order to prevent any entry of external air.

The internally sterile container R proceeding from the manufacturing plant 1 is conveyed through free air into the chamber 8. Within the chamber 8 an external sterilization of the container is performed, for instance through sprinkling or spraying by means of a chemically sterilizing solution conveyed through the pipe 10.

The container thus sterilized internally and externally passes into the enclosure 4 wherein the container neck is first severed by means of the device 5, the severed portion of the neck being discharged through the discharge chamber 11, and then the container thus opened is filled by means of the device 6 and the filled container is lastly closed by means of the heat-welding apparatus 7.

The filled and closed container is then discharged through the chamber 9.

It should be noted that since the opening of the containers is carried out within the sterile packing or conditioning enclosure, an opening of as large dimensions as desired may be provided so as to facilitate the subsequent filling operation.

It is obvious that many modifications of the various operations described above may be used.

For instance, the manufacturing plant, instead of being a blowing-extrusion plant, may consist of a plant of any other type capable of producing a sealed container filled with a sterilizing gas, for instance a pressure-moulding plant wherein at least the mould is enclosed in a sealed enclosure filled with sterilizing gas. Instead of performing the transfer of the containers in free atmosphere from the container manufacturing plant 1 to the packing or conditioning enclosure 4, the said transfer may be effected under sterile conditions, for instance by making the containers move from the said plant to the said packing or conditioning enclosure through a tunnel which is itself maintained in a sterile state.

The closing of the container subsequent to filling, instead of being performed by means of a heat-welding apparatus, may be effected by means of an apparatus of another type, for instance a heat-sticking or capping apparatus.

Lastly, the chambers 8 and 9, instead of being mechanical chambers, i.e. instead of communicating alternately with the exterior and the enclosure 4, may be constituted by hydraulic chambers, i.e. by passages communicating on the one hand with the said enclosure and on the other hand with the exterior, the said passages being filled with a liquid in which the container is immersed. In this case, at least the liquid in the inlet chamber is a microbicidal or germ-killing liquid ensuring external sterilization of the container during its introduction.

Of course, the invention is by no means limited to the forms of embodiment described and illustrated which have been given by way of example only. In particular, it comprises all the means constituting technical equivalents to the means described as well as their combinations, should the latter be carried out according to the spirit of the invention.

I claim:

1. Method of aseptic packing of a previously sterilized product, in particular a food product such as a milk product, using plastic containers produced in a manufacturing plant, said containers being closed sealingly and sterilized internally, comprising the steps of bringing said containers in free atmosphere from said manufacturing plant to a packing enclosure sealingly isolated from the external atmosphere and provided with inlet and outlet chambers adjoining said packing enclosure, said enclosure containing devices for the transfer, the opening, the filling with said previously sterilized product to be packed and the closing of said containers, introducing said containers into said inlet chamber and simultaneously sterilizing them externally in said inlet chamber, then transferring the externally sterilized containers directly from the inlet chamber into the enclosure, then opening said containers in said packing enclosure by severing each container neck, discharging the severed container neck into a discharge chamber adjacent the packing enclosure, filling the opened containers with the said product, closing them sealingly and discharging them from said enclosure into said outlet chamber, said introducing and discharging operations in said inlet and outlet chambers being performed while preventing any communication between the interior of the enclosure and the external atmosphere.

2. Method according to claim 1 wherein the said plastic of said containers is a thermoplastic material.

3. Method according to claim 1, wherein said external sterilization of said container is performed by introducing the latter into an inlet chamber communicating alternately with either the exterior or the said packing enclosure and wherein a microbicidal agent is injected.

4. Method according to claim 1, wherein external sterilization of said container is performed by introducing the latter into a passageway communicating with the exterior and with the said enclosure and filled with a microbicidal liquid in which said container is immersed.

5. Method according to claim 1 wherein the opening of said container is performed by severing said plastic material, the neck portion thus severed being discharged towards the exterior by immersion in a passageway filled with liquid.

6. Method according to claim 1, wherein the closing of said container is performed by heat-welding.

7. Method according to claim 1, wherein the discharge of said container from said packing enclosure is performed by introducing the said container into a chamber communicating alternately with either the said packing enclosure or with the atmosphere.

8. Method according to claim 1, wherein the discharge of said container from the said packing enclosure is performed by introducing the said container into a passageway communicating with the said packing enclosure and with the exterior and filled with a liquid in which the container is immersed.

References Cited

UNITED STATES PATENTS

| 2,761,603 | 9/1956 | Fairchild | 99—182 X |
| 2,816,837 | 12/1957 | Holsman | 99—182 X |
| 2,949,712 | 8/1960 | Bieberdorf et al. | 99—182 X |
| 2,991,500 | 7/1961 | Hagen | 264—98 X |
| 3,105,335 | 10/1963 | Hickey | 99—182 X |
| 3,180,740 | 4/1965 | Martin | 99—182 |
| 3,399,508 | 9/1968 | Frielingsdorf et al. | 53—140 |
| 3,401,043 | 9/1968 | Finley et al. | 99—171 RX |
| 3,512,996 | 5/1970 | Roe | 99—183 X |

NORMAN YUDKOFF, Primary Examiner

K. P. VAN WYCK, Assistant Examiner

U.S. Cl. X.R.

53—140; 264—98